May 24, 1960 J. B. DAVIES 2,937,476
RING MOULDS FOR CASTING GLASS DISCS
Filed Nov. 10, 1955 3 Sheets-Sheet 1
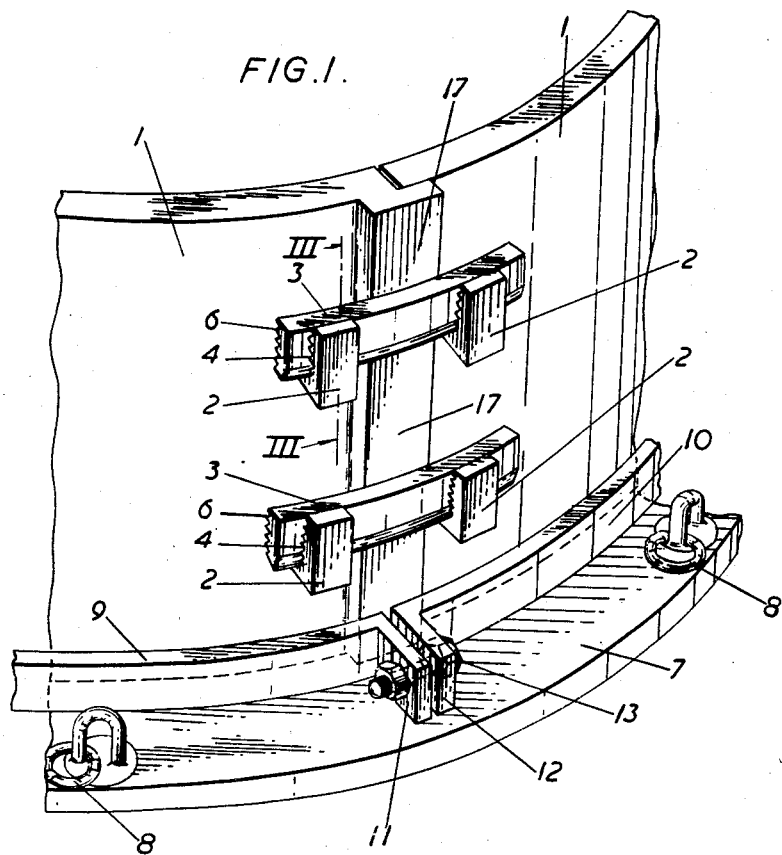
Inventor
John Berwyn Davies
By
Harrison, Kennedy Campbell
Attorneys May 24, 1960  J. B. DAVIES  2,937,476
RING MOULDS FOR CASTING GLASS DISCS
Filed Nov. 10, 1955  3 Sheets-Sheet 2
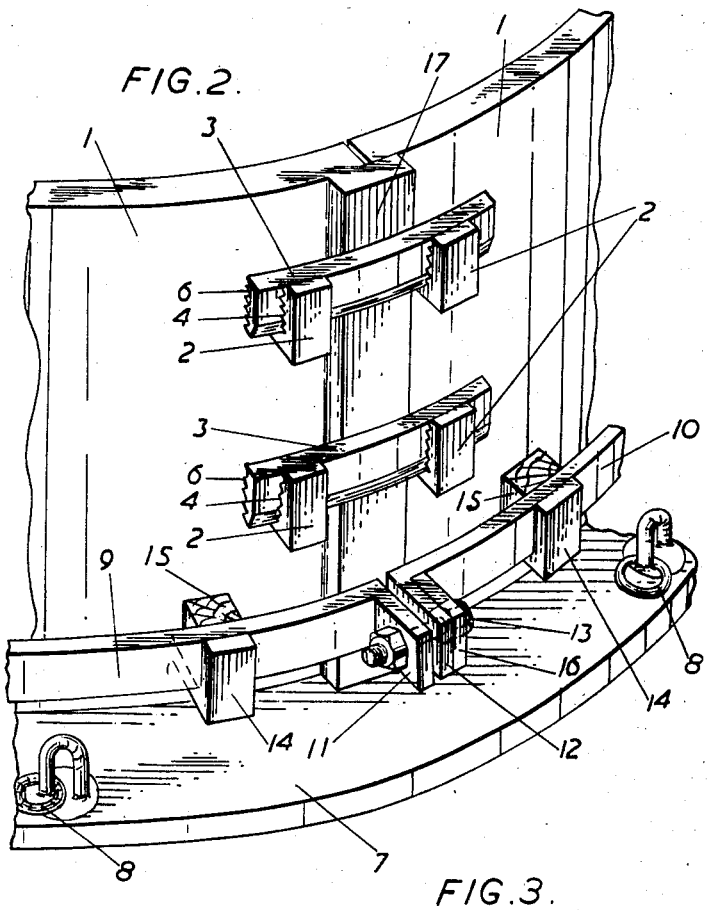
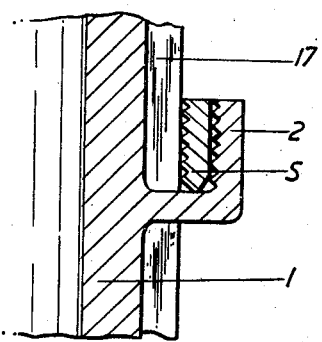
Inventor
John Berwyn Davies
By
Morrison, Kennedy & Campbell
Attorneys

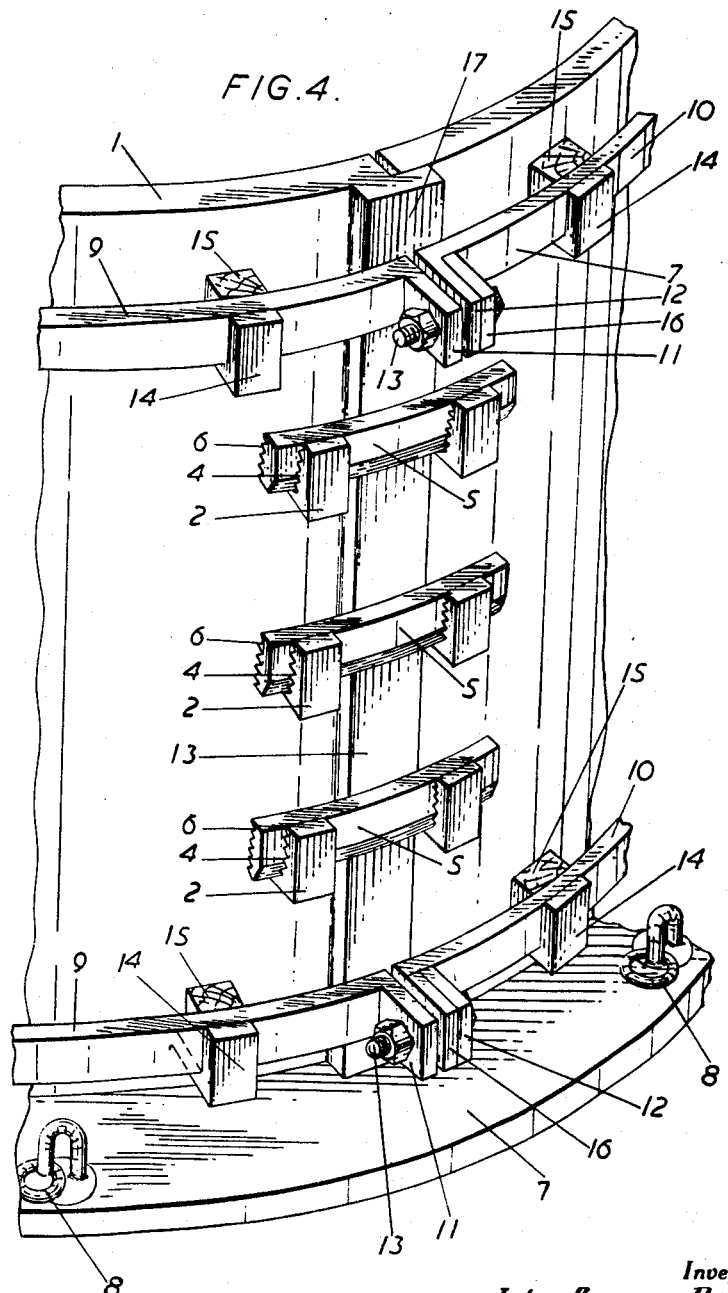

United States Patent Office 2,937,476
Patented May 24, 1960

2,937,476
RING MOULDS FOR CASTING GLASS DISCS

John B. Davies, Mossley Hill, Liverpool, England, assignor to Pilkington Brothers Limited, Liverpool, England, a corporation of Great Britain Filed Nov. 10, 1955, Ser. No. 546,225

Claims priority, application Great Britain Nov. 25, 1954

7 Claims. (Cl. 49—65)

This invention relates to the manufacture of glass discs.

Glass reflector discs for telescopes usually are of diameters of up to 100", for example 4", 78". In the manufacture of such discs, the molten glass is poured into a ring mould of the desired dimension and, in the process of moulding, very considerable trouble is experienced because the glass has a low co-efficient of expansion the glass often being a boro-silicate glass, whilst the iron or steel from which the mould wall is made has a relatively great coefficient of expansion. As the glass is poured into the mould the mould expands, but when the casting is finished and the glass begins to cool, very damaging stresses are set up by reason of the relatively great contraction of the mould wall as compared with the contraction of the body of the glass.

The mould wall is made for example of two rigidly connected semi-circular steel sections, disposed on a cast iron base plate but, if the semi-circular walls are left in situ surrounding the molten glass during cooling, then, because the steel will contract much more than the glass, the glass will probably be broken by the forces set up. On the other hand, the mould sections cannot be taken away from the molten glass until at least the peripheral area of the glass has set sufficiently to make the cast mass self-supporting. The ensuing delay involves a loss of heat in the glass without complete control of the rate of cooling, and results in the glass not being hot enough when it is placed in the lehr to prevent cracks developing. Hence, fissures may appear in the glass because internal forces are set up owing to the lack of control in cooling.

The main object of the present invention is to provide an apparatus for manufacturing glass discs, particularly discs for telescopes, of the dimensions required, in which the molten mass is introduced into the lehr immediately after casting, and the walls of the mould although they support the mass when it is molten do not afterwards generate forces during cooling which damage the cast discs.

A ring mould of the kind described for casting glass telescope discs constructed according to the present invention comprises a mould wall including wall sections, loosely juxtaposed on a base element to impart the desired peripheral configuration to the disc, external rigid latch bars freely disposed across contiguous ends of wall sections and locating means carried by the wall sections to hold the latch bars to the wall, whereby the latch bars link the sections to constitute the mould wall but permit circumferential movement of the sections contracting the mould during the annealing of a disc cast into the mould.

During pouring of the molten glass into the mould, horizontal forces are applied to the mould wall which, generally speaking, are not symmetrical, and, to prevent spreading or splaying of the wall sections during pouring, a temporary reinforcement may be employed to support the wall sections against the greatest force developed during pouring. To this end, a ring mould constructed according to the present invention may also comprise a hoop encircling the mould wall to temporarily reinforce the wall sections against the forces directed against the wall by the molten glass during pouring.

After the molten glass has settled to uniform depth in the mould, the ring may be taken away, because it is found that, in the case of the smaller discs, for example discs of 40" in diameter and 7" thick, the hydrostatic head of molten glass is not sufficient to overcome such friction as there is resisting the sliding of the mould sections on the base plate and relatively to each other that would have to occur in any outward bursting movement of the mould wall. Alternatively, however, an encircling ring may be spaced from the wall sections by spacing elements which are combustible at the temperature produced in the wall sections after casting, whereby the embracing effect of the encircling ring is automatically dissolved by the heat in the mould.

In one practical embodiment of the present invention, the wall sections of the ring mould each carry angle lugs near each end, whereby adjacent sections may be latched by dropping arcuate latch bars on to the juxtaposed pair of lugs, which latch bars become parallel or substantially parallel with the base, and the inward face of each latch bar and each angle lug is serrated, the serrations running in a horizontal direction, and the lower edge of each latch bar is bevelled whereby friction between the latch bars the sections and the angle lugs during relative circumferential movement of the ring sections is minimized. With such form of ring mould the wall sections may be provided with one or more horizontal series of angle lugs to support an encircling hoop in spaced relation with the wall sections, the spacing being such as to enable combustible blocks, e.g. of wood, to be fitted between the ring and the mould walls.

The reinforcing hoop or the encircling ring may be a jointed element with packing blocks incorporated in the fastening means of the joints, said packing blocks being combustible at the temperature produced in the wall sections after casting is completed, whereby the restraint exerted by the element is automatically relaxed by the heat in the mould and the joints are free to open to an extent equal to the thickness of the packing blocks as the sections of the jointed element contract.

The present invention also comprises a method of casting glass telecspope discs which consists in pouring the molten glass into a ring mould of the desired configuration, the ring mould being constituted by wall sections loosely disposed on a base element, the sections being loosely latched together in the desired configuration by rigid latches and embraced against outward displacement by a hoop spaced from the wall sections by interposed spacing elements, which are combustible under the heat in the mould after casting, disposing the casting and mould assembly in a lehr to regulate the cooling of the casting in the mould, and automatically eliminating the embracing effect of the hoop on the sections when the glass has become sufficiently set to be self-supporting, by burning the spacing element, thereby freeing the mould sections for relative circumferential movement during subsequent contraction.

In order that the invention may be more clearly understood, preferred embodiments thereof will now be described by way of example, with reference to the accompanying diagrammatic drawings, in which:

Fig. 1 is a fragmentary pictorial elevation of a circular mould of a type suitable for moulding discs of comparatively small thickness, say 7" and of about 40" in diameter, Fig. 2 is a view similar to Figure 1, showing a modified construction, Fig. 3 is a vertical section taken on the line III—III of Figure 1, and Fig. 4 is a pictorial elevation of a circular mould of a type suitable for moulding large discs, say discs of about 78″ in diameter and 14″ thickness.

In the drawings, like references designate same or similar parts.

Referring first to Figures 1-3 of the drawings, the ring mould comprises a plurality, say eight, of wall sections 1 disposed in abutting relation and, near each end of each wall section and in the middle area of the sections, are lugs 2, constituting juxtaposed pairs of lugs, and, on each pair of lugs is latched a rigid latch bar 3. The latch bars 3 loosely connect adjacent wall sections and keep them together to form a mould wall.

The inward face 4 of each lug 2 and the inward face 6 of each latch bar 3 are serrated, the serrations running in a horizontal direction to minimize friction between the latches and the lugs and the latches and the wall sections of the mould, to permit circumferential relative movement between the sections during casting and during cooling of the cast glass in the lehr. The lower edge of each latch bar is bevelled as shown to further reduce the area of contact between the latches and the lugs.

The wall sections are disposed on a base plate 7 provided with rings 8 by which the base plate and the assembly mould containing the molten glass can be hoisted from the casting position and lowered into a lehr, where the rate of cooling is regulated. To reinforce the mould wall during casting, that is, when unequal forces are directed against the wall sections, a hoop made in two parts 9, 10 is located on the base plate 7, each half hoop terminating at each end with lugs 11, 12 respectively, which are bolted together as indicated at 13, the essential function of the hoop 9, 10 being to eliminate the possibility of the mould distorting under the forces which occur during pouring, which may be unsymmetrical.

After erecting the wall sections 1 on the base plate 7, the latch bars are dropped into position on the lugs 2 and pouring may then be effected. After pouring is completed and the molten glass has settled to uniform depth in the mould, the ring may be taken away, as it is found that the hydrostatic head of static molten glass in the smaller discs is not sufficient to overcome such friction as there is resisting the sliding movement of the wall sections on the base plate, as would occur in any outward movement of the wall sections. The assembly of the latched wall sections on the base plate containing the molten glass can then be hoisted from the casting position into a lehr, where the rate of cooling is regulated.

In the modified construction shown in Figure 2, the encircling element comprising half hoops 9, 10 is located on lugs 14, which lock the ring in spaced relation with the wall sections, and wooden blocks soaked in sodium silicate indicated at 15 are driven between the encircling elements 9, 10 and the wall sections 1, at a location such that they can rest on the lugs 14. The wooden blocks 15 are soaked in sodium silicate, and accordingly are slowly combustible at the temperature of the wall sections 1, which occurs from the heat in the molten glass in the mould. Accordingly, after pouring the molten glass into the mould, it is not necessary to disconnect the encircling ring 9, 10, as the embracing effect of the ring is automatically dissolved as the blocks 15 are burnt by the heat within the mould. Thus the mould assembly can be transferred to a lehr immediately after pouring has been completed, and, as soon as the glass has become sufficiently set to be self-supporting, the wall sections of the mould are free for relative circumferential movement during subsequent contraction of the wall sections.

In the production of glass telescope discs of the larger size, more than one potful of glass may be required to be poured into the mould. In the production of discs of 78″ diameter and of a thickness of 14″, two potfuls of glass, making a total weight of about 2¼ tons may have to be poured into the mould, an interval between the two pourings often being unavoidable In consequence, the mould wall is subjected to the unequal forces which occur when only the lower part of the mould is filled and, to reinforce the mould against the horizontal forces applied to the mould wall during the second pouring, the mould wall is provided, in the upper region (as shown in Figure 4) with lugs 14 to support the jointed ring 9, 10, between which and the wall sections are driven wooden blocks 15, so that the reinforcement at the top and at the bottom can be dissolved by the heat in the mould, in order to remove the embracing effect of the jointed ring 9, 10, during the cooling of the molten glass in the lehr.

In the constructions hereinbefore described with reference to Figures 2-4, involving the use of combustible blocks between the wall sections and the encircling elements 9, 10, a further loosening effect can be obtained by incorporating combustible packing blocks 16 under the heads of the bolts of the joints of the encircling elements, so that the restraint exerted by the encircling elements is automatically broken by the heat in the mould, as a result of the blocks 16 being consumed by the heat. Thus the joints are freed to open as the ring contracts. Clearly, the blocks 16 can be of sufficient size to permit the use of the encircling elements 9, 10 without the interposed blocks 15 but experience has shown that it is preferable to include both the blocks 15 and the blocks 16.

By the present invention, the molten mass contained in the mould is freed from constraints as soon as the moulded mass has stiffened enough to be self-supporting, hence damaging stresses in the mass do not occur Moreover, as the molten mass can be so quickly moved into a lehr, there is such a complete control of the rate of cooling that fissures do not appear in the glass.

In the drawings, the abutting wall sections 1 are shown with a coverplate 17 over the line of abutment of the wall sections. The coverplate, may, as shown in the drawings, be integral with a wall section. Each wall section may have at one end an integral plate 17, but it is found convenient to use two types of wall sections, one type comprising an integral plate 17 at each vertical edge and the other type being plain sections, the vertical edges of which fit against the plate 17 on the alternate sections.

I claim:

1. A ring mould of the kind described for casting glass telescope discs comprising a mould wall including wall sections, loosely juxtaposed on a base element to impart the desired peripheral configuration to the disc, external rigid latch bars freely disposed across contiguous ends of wall sections, locating means carried by the wall sections to hold the latch bars to the wall, whereby the latch bars link the sections to constitute the mould wall but permit circumferential movement of the sections contracting the mould during the annealing of a disc cast into the mould, a hoop encircling the mould wall and adapted to temporarily reinforce the wall sections against the outwardly directed forces exerted against the wall by the molten glass during pouring, said hoop being spaced from the mould wall, and spacing elements between the mould wall and the hoop combustible at the temperature produced in the wall sections after casting, whereby the embracing effect of the encircling hoop is automatically dissolved by the heat in the mould.

2. A ring mould of the kind described for casting glass telescope discs comprising a mould wall including wall sections, loosely juxtaposed on a base element to impart the desired peripheral configuration to the disc, external rigid latch bars freely disposed across contiguous ends of wall sections, external angle lugs carried by the wall sections in which the latch bars are supported so as to be held against the wall, whereby the latch bars link the sections to constitute the mould wall but permit circumferential movement of the sections contracting the mould during the annealing of a disc cast into the mould, a hoop encircling the mould wall and adapted to temporarily reinforce the wall sections against the outwardly directed forces exerted against the wall by the molten glass during pouring, said hoop being spaced from the mould wall, and spacing elements between the mould wall and the hoop combustible at the temperature produced in the wall sections after casting, whereby the embracing effect of the encircling hoop is automatically dissolved by the heat in the mould.

3. A ring mould of the kind described for casting glass telescope discs comprising a mould wall including wall sections, loosely juxtaposed on a base element to impart the desired peripheral configuration to the disc, each wall section carrying external angle lugs near each end, external arcuate rigid latch bars latched on each juxtaposed pairs of lugs parallel or substantially parallel with the base so as to connect the sections to constitute the mould wall but permit circumferential movement of the sections contracting the mould during the annealing of a disc cast into the mould, and the inward face of each latch bar and each angle lug being serrated, the serrations running in a horizontal direction, and the lower edge of each latch bar being bevelled, whereby friction between the latch bars, the sections and the angle lugs during said circumferential movement of the wall sections is minimized, a horizontal series of external angle lugs provided on the wall sections, a hoop encircling the mould wall whilst supported by the latter angle lugs and spaced from the wall sections, and spacing elements between the mould wall and the hoop combustible at the temperature produced in the wall sections after casting, whereby the hoop temporarily reinforces the wall sections against the outwardly directed forces exerted against the wall by the molten glass during pouring but its embracing effect is subsequently automatically dissolved by the heat in the mould.

4. A ring mould of the kind described for casting glass telescope discs comprising a mould wall including wall sections, loosely juxtaposed on a base element to impart the desired peripheral configuration to the disc, external rigid latch bars freely disposed across contiguous ends of wall sections, locating means carried by the wall sections to hold the latch bars to the wall, whereby the latch bars link the sections to constitute the mould wall but permit circumferential movement of the sections contracting the mould during the annealing of a disc cast into the mould, and a hoop encircling the mould wall adapted to temporarily reinforce the wall sections against the outwardly directed forces exerted against the wall by the molten glass during pouring, said encircling hoop having a joint and fastening means for said joint including a packing block blocking the opening of the joint and combustible at the temperature produced in the wall sections after casting is completed, whereby the continuity of the hoop is automatically broken by the heat in the mould and the joint is free to open.

5. A ring mould of the kind described for casting glass telescope discs comprising a mould wall including wall sections, loosely juxtaposed on a base element to impart the desired peripheral configuration to the disc, each wall section carrying external angle lugs near each end, external arcuate rigid latch bars latched on each juxtaposed pair of lugs parallel or substantially parallel with the base so as to connect the sections to constitute the mould wall but permit circumferential movement of the sections contracting the mould during the annealing of a disc cast into the mould, and the inward face of each latch bar and each angle lug being serrated, the serrations running in a horizontal direction, and the lower edge of each latch bar being bevelled, whereby friction between the latch bars, the sections and the angle lugs during said circumferential movement of the wall sections is minimized, a jointed hoop encircling the mould wall and spaced from the wall sections by spacing elements, fastening means for the hoop joint and packing blocks incorporated in the fastening means of the joint, said spacing elements and packing blocks being combustible at the temperature produced in the wall sections after casting is completed, whereby the hoop temporarily reinforces the wall sections against the forces directed against the wall by the molten glass during pouring but its embracing effect is subsequently automatically dissolved by the combustion of the packing blocks and spacing elements.

6. A ring mould open at the top and having a base element closing the bottom for casting therein glass telescope discs by pouring the molten glass into the open top thereof, said mould comprising a peripheral mould wall including arcuate wall sections loosely juxtaposed end to end on said base element to constitute the ring-like wall of the mould for the casting operation, arcuate rigid latch bars freely disposed externally across the contiguous ends of the wall sections in sliding relation therewith, and angle lugs on said contiguous ends to support said latch bars against the wall sections to link them together and to hold them in peripheral arcuate wall formation, the inward face of each latch bar and each angle lug being serrated, the serrations running in a horizontal direction, and the lower edge of each latch bar being bevelled, whereby friction between the latch bars, the sections and the angle lugs during said circumferential movement of the wall sections is minimized.

7. A ring mould open at the top and having a base element closing the bottom for casting therein glass telescope discs by pouring molten glass into the open top thereof, said mould comprising a peripheral wall made up of a series of arcuate wall sections to impart the desired peripheral configuration to the discs and capable of expansion and contraction during the casting and subsequent annealing operations, said wall sections having vertical edges juxtaposed in pairs, the juxtaposed ones of at least certain pairs being arranged to be spaced from each other when the sections are contracted, a cover plate disposed exteriorly of each pair of juxtaposed vertical edges, said cover plates being carried by at least certain of said wall sections, the wall sections carrying adjacent their vertical edges external angle lugs arranged substantially in peripheral alignment, arcuate latch bars extending externally across cover plates at the contiguous edges of adjacent wall sections and supported freely in place by the contiguous pair of lugs thereon so as to hold all of the wall sections together in peripheral arcuate formation, said latch bars on their inner faces making sliding contact with the cover plates and on their outer faces making sliding contact with the inner faces of the upstanding portions of the angle lugs during the expansion and contraction of the wall sections.

References Cited in the file of this patent

UNITED STATES PATENTS

| | | |
|---|---|---|
| 204,783 | Babbitt | June 11, 1878 |
| 745,585 | Ferguson | Dec. 1, 1903 |
| 875,518 | Georgenson | Dec. 31, 1907 |
| 1,050,816 | Deslauriers | Jan. 21, 1913 |
| 1,454,066 | Myers | May 8, 1923 |
| 1,455,643 | Manning | May 15, 1923 |
| 1,505,470 | Kelm | Aug. 19, 1924 |
| 1,722,124 | Adey et al. | July 23, 1929 |
| 1,837,452 | Le May | Dec. 22, 1931 |
| 1,949,083 | Roberg | Feb. 27, 1934 |
| 2,264,288 | Betterton et al. | Dec. 2, 1941 |

UNITED STATES PATENT OFFICE

CERTIFICATE OF CORRECTION

Patent No. 2,937,476                                               May 24, 1960

John B. Davies

It is hereby certified that error appears in the printed specification of the above numbered patent requiring correction and that the said Letters Patent should read as corrected below.

Column 1, line 17, for "4″, 78″" read -- 40″, 78″ --.

Signed and sealed this 8th day of November 1960.

(SEAL)
Attest:

KARL H. AXLINE                                          ROBERT C. WATSON
Attesting Officer                                       Commissioner of Patents